(12) United States Patent
Jestin et al.

(10) Patent No.: US 8,143,853 B2
(45) Date of Patent: Mar. 27, 2012

(54) BATTERY WITH SERIAL CELL MODULES, AND VEHICLE EQUIPPED WITH THE SAME

(75) Inventors: Jean-Jacques Jestin, Fouesnant (FR); Jean-Luc Monfort, Quimper (FR); Christian Sellin, Concarneau (FR); Jacques Colin, Quimer (FR)

(73) Assignee: BATSCAP, Gaberic (FR)

( * ) Notice: Subject to any disclaimer, the term of this patent is extended or adjusted under 35 U.S.C. 154(b) by 351 days.

(21) Appl. No.: 12/526,028

(22) PCT Filed: Feb. 1, 2008

(86) PCT No.: PCT/EP2008/051281
§ 371 (c)(1),
(2), (4) Date: Nov. 3, 2009

(87) PCT Pub. No.: WO2008/101787
PCT Pub. Date: Aug. 28, 2008

(65) Prior Publication Data
US 2010/0090648 A1    Apr. 15, 2010

(30) Foreign Application Priority Data
Feb. 6, 2007   (FR) ..................................... 07 00826

(51) Int. Cl.
*H02J 7/00*   (2006.01)
(52) U.S. Cl. ........................................ 320/118; 320/116
(58) Field of Classification Search .................. 320/118, 320/116, 119
See application file for complete search history.

(56) References Cited

U.S. PATENT DOCUMENTS

| | | |
|---|---|---|
| 5,204,611 A | 4/1993 | Nor et al. |
| 5,773,962 A | 6/1998 | Nor |
| 6,025,695 A | 2/2000 | Friel et al. |
| 6,225,788 B1 | 5/2001 | Kouzu et al. |
| 7,274,170 B2 * | 9/2007 | Benckenstein et al. ........ 320/119 |
| 2005/0077878 A1 | 4/2005 | Carrier et al. |
| 2005/0110460 A1 * | 5/2005 | Arai et al. ...................... 320/116 |
| 2006/0028182 A1 | 2/2006 | Yang et al. |
| 2006/0028183 A1 | 2/2006 | Izawa et al. |
| 2006/0103351 A1 * | 5/2006 | Tanigawa et al. ............. 320/118 |
| 2006/0123622 A1 | 6/2006 | Guy |
| 2006/0193095 A1 | 8/2006 | Hunter et al. |
| 2006/0263688 A1 | 11/2006 | Guyomard et al. |
| 2007/0169338 A1 | 7/2007 | Deschamps |
| 2008/0076025 A1 | 3/2008 | Guyomard et al. |

FOREIGN PATENT DOCUMENTS

| | | |
|---|---|---|
| DE | 196 14 435 | 4/2006 |
| EP | 1 319 556 | 6/2003 |
| EP | 0 998 778 | 4/2004 |
| EP | 1581978 | 8/2008 |

(Continued)

*Primary Examiner* — M'Baye Diao
(74) *Attorney, Agent, or Firm* — Harness, Dickey & Pierce, P.L.C.

(57) ABSTRACT

The application relates to a battery including a pack of modules, each containing rechargeable cells in series, the battery including means for measuring the voltage and/or the temperature of at least one module. According to the application, the battery includes means for computing, based on the voltage and/or temperature measured by the measuring means and on a recorded characteristic of the discharge current and/or regeneration current of the battery, a maximum discharge and/or regeneration current limit of the pack. The battery also includes a transmission means for transmitting to the outside the information on the maximum discharge and/or regeneration current limit of the pack.

18 Claims, 7 Drawing Sheets

FOREIGN PATENT DOCUMENTS

| | | |
|---|---|---|
| FR | 2849280 | 6/2004 |
| WO | WO 93/06473 | 4/1993 |
| WO | WO99/31752 | 6/1999 |
| WO | WO0193398 | 12/2001 |
| WO | WO 02/091544 | 11/2002 |
| WO | WO2004059776 | 7/2004 |
| WO | WO2004059777 | 7/2004 |

* cited by examiner

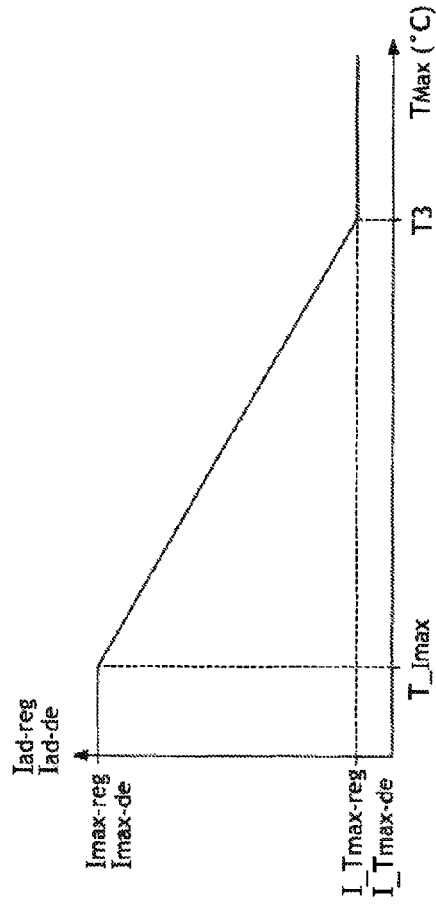
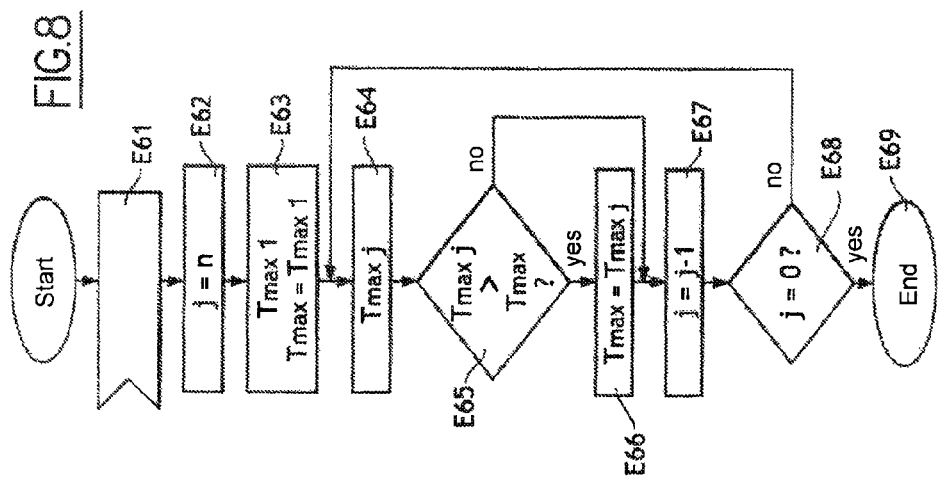

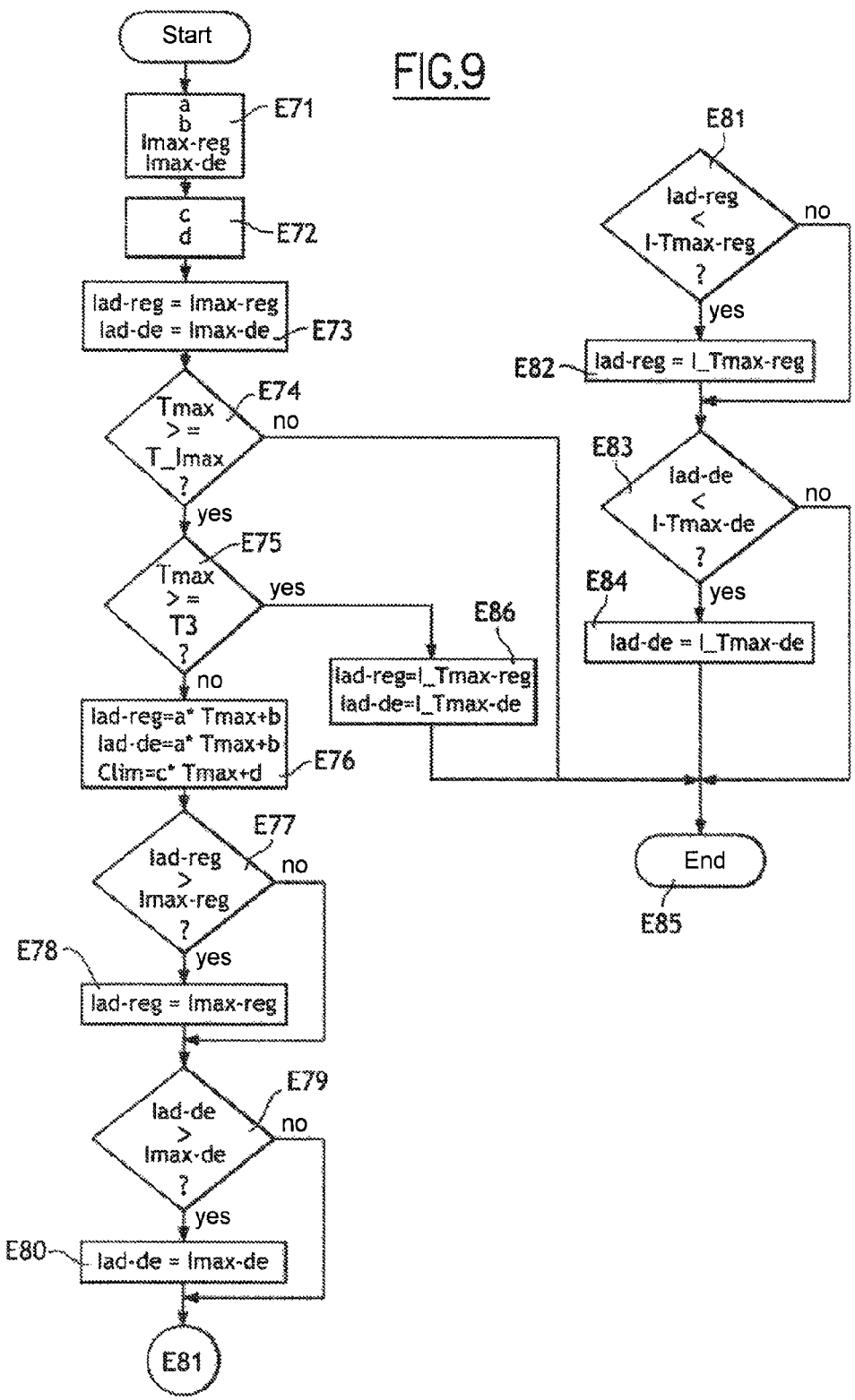

BATTERY WITH SERIAL CELL MODULES, AND VEHICLE EQUIPPED WITH THE SAME

CROSS REFERENCE TO RELATED APPLICATIONS

This application is a National Phase Entry Application of International Application No. PCT/EP2008/051281, filed Feb. 1, 2008, which claims priority to French Application No. 07 00826, filed Feb. 6, 2007; both of which are incorporated by reference herein.

BACKGROUND AND SUMMARY

The invention relates to a battery including rechargeable cells in series.

A field of application of the invention is in power batteries, such as for example those used as an energy source for driving a traction motor drive in electric vehicles. This type of onboard battery of an electric vehicle for example has cells of lithium-metal-polymer technology. Of course, the battery may have other applications, for example for powering fixed devices. The cells of the battery may be loaded by connecting the latter to a suitable charger.

The power consuming device, powered by the battery, may if necessary recharge the cells, such as for example in the case of an electric vehicle in a braking situation, in which a regeneration electric current is provided from the traction motor drive to the battery. The use of the battery by a power-consuming device imposes control of the regeneration and discharge phases.

Indeed, upon operating the battery, overload or excessive regeneration cause oxidation of the products making up the positive electrode and the electrolyte of the battery. This oxidation causes alteration of the battery, which means notably a rapid increase in the internal resistance. Intensive and prolonged overloading may have the consequence of destruction of the battery.

Excessive discharge causes a parasitic electrochemical reaction within the active material of the positive electrode, with the consequence of rapid and irreparable lowering of the capacity of the battery. This reaction also has the consequence of an increase in the internal resistance. Thus, excessive regeneration and/or excessive discharge substantially reduce the lifetime of the battery.

Further, regeneration of the battery at a too low temperature substantially promotes the formation of dendrites, which also causes a reduction in the lifetime of the battery. A discharge at a too low temperature will have the consequence of faster lowering of the voltage because of the high internal resistance of the battery.

The invention is directed to obtaining a battery with which it is possible to prevent excessive discharges and/or excessive regenerations during its use by a power-consuming device, in order to preserve the lifetime of the battery. For this purpose, a first object of the invention is a battery including a pack of a plurality of modules, each containing a multiplicity of rechargeable cells in series, the battery further including means for measuring the voltage of at least one cell and/or the temperature of at least one module,
  characterized in that it includes:
  means for computing, based on the voltage and/or temperature measured by the measuring means and on a recorded characteristic of the discharge current and/or regeneration current of the battery, a maximum discharge and/or regeneration current limit of the pack,
  a transmission means for transmitting outside the information on the maximum discharge and/or regeneration current limit of the pack.

In an embodiment of the invention, the modules are in series and the recorded current characteristics from the computing means relate to the modules in series.

In an embodiment of the invention,
  the battery includes:
    on each module, means for measuring the voltage of several cells of the module, and/or
    means for measuring the temperature of several modules, and
  the computing means include:
    first means for computing, from the voltages and/or temperatures measured by the measuring means, at least one first extremal quantity, selected from:
      a first maximum cell voltage,
      a second maximum module voltage,
      a third minimum cell voltage,
      a fourth minimum module voltage,
      a fifth maximum module temperature,
    second means for computing, as a maximum discharge and/or regeneration current limit of the pack, at least one value from:
  a maximum authorized pack regeneration current value depending on the first and/or second maximum voltage,
  a maximum authorized pack discharge current value depending on the third and/or fourth minimum voltage,
  a maximum admissible pack regeneration current value depending on the fifth maximum module temperature,
  a maximum admissible pack discharge current value depending on the fifth maximum module temperature.
  According to other features of the invention:
  Each module includes the first computing means, one of the modules is a master, while the other modules are slaves of the master module so as to transmit to it said at least one first extremal quantity through a communications network connecting the modules with each other, the second computing means and the outward transmission means being provided on the master module.
  The maximum authorized regeneration current value is computed by the second means, so that:
    it is equal to a first upper regeneration current value when the second maximum module voltage is less than a first module voltage threshold,
    it is equal to a second intermediate regeneration current value when both the second maximum module voltage is larger than or equal to the first module voltage threshold and the first maximum cell voltage is less than a first cell voltage threshold,
    it is equal to a third lower regeneration current value, when both the first maximum cell voltage is larger than or equal to the first cell voltage threshold and less than a second cell voltage threshold, and the second maximum module voltage is less than a second module voltage threshold,
    it is zero, when the first maximum cell voltage is larger than or equal to the second cell voltage threshold or when the second maximum module voltage is larger than or equal to the second module voltage threshold,
    the first cell voltage threshold being smaller than the second cell voltage threshold, and the first module voltage threshold being smaller than the second module voltage threshold;
  The maximum authorized discharge current value is computed by the second means so that:

it is equal to a first intermediate discharge current value, when both the fourth minimum module voltage is larger than or equal to a third module voltage threshold and less than a fourth module voltage threshold, and the third minimum cell voltage is larger than or equal to a third cell voltage threshold and less than a fourth cell voltage threshold, it is equal to a second upper discharge current value when both the third minimum cell voltage is larger than the fourth cell voltage threshold and the fourth minimum module voltage is larger than the fourth module voltage threshold, it is zero otherwise;

The maximum admissible regeneration current value is calculated by the second means, so that it is equal to a fourth upper regeneration current value, when the fifth maximum module temperature is less than a first module temperature threshold, it is equal to a decreasing function of the fifth maximum module temperature, when the fifth maximum module temperature is larger than or equal to the first module temperature threshold and less than a second module temperature threshold, the values of this function being less than or equal to the fourth upper regeneration current value and larger than or equal to a fifth lower regeneration current value, it is otherwise equal to the fifth lower regeneration current value, either positive or zero;

The maximum admissible discharge current value is computed by the second means, so that it is equal to a first upper discharge current value, when the second maximum module temperature is less than a first module temperature threshold, it is equal to a decreasing function of the fifth maximum module temperature, when the fifth maximum module temperature is larger than or equal to the first module temperature threshold and less than a second module temperature threshold, the values of this function being less than or equal to the fourth upper discharge current value and larger than or equal to a fifth lower discharge current value, it is otherwise equal to the fifth lower discharge current value, either positive or zero;

The decreasing function of the fifth maximum module temperature is linear;

The second means are provided for computing, for the discharge current and/or the regeneration current, both a maximum authorized value and a maximum admissible value, the maximum discharge and/or regeneration current limit of the pack being the largest of both the maximum authorized value and the maximum admissible value;

The battery includes means for measuring the voltage of each cell and/or means for measuring the temperature of each module;

The battery includes means for measuring the module temperature in at least two different zones of the module, the measured temperature of the module being the largest of the temperatures of the zones of the module;

The transmission means comprises an interface with a network for communication to the outside;

The cells are made by assemblies of thin films;

The cells have a nominal operating temperature above 20° C.;

The cells are of the lithium-metal-polymer type;

Each module further includes at least one unit for heating its cells to their nominal operating temperature above 20° C.

A second subject matter of the invention is a motor vehicle, including a traction motor drive and at least one battery as described above, for supplying at least temporarily the traction motor drive with electric power, characterized in that the traction motor drive includes a supervisor having means for receiving information on the maximum discharge and/or regeneration current limit of the pack, sent by the transmission means of the battery.

BRIEF DESCRIPTION OF THE DRAWINGS

The invention will be better understood upon reading the description which follows, only given as a non-limiting example with reference to the appended drawings, wherein:

FIG. 8 is a flowchart of the method for acquiring the maximum temperature of the modules according to the invention;

FIG. 9 is a flowchart of the method for automatically adapting the current, depending on temperature values, according to the invention; and FIG. 10 is a graph of a maximum admissible current value according to the invention.

DETAILED DESCRIPTION

The invention is described below with reference to the embodiment illustrated in the figures, in which the cells are made by assembling films, for example in lithium-metal-polymer. The total thickness of these films is for example less than 300 micrometers and for example of about 150 micrometers. The cells have a nominal operating temperature above 20° C., for example 90° C. for lithium-metal-polymer technology.

Figure 1:
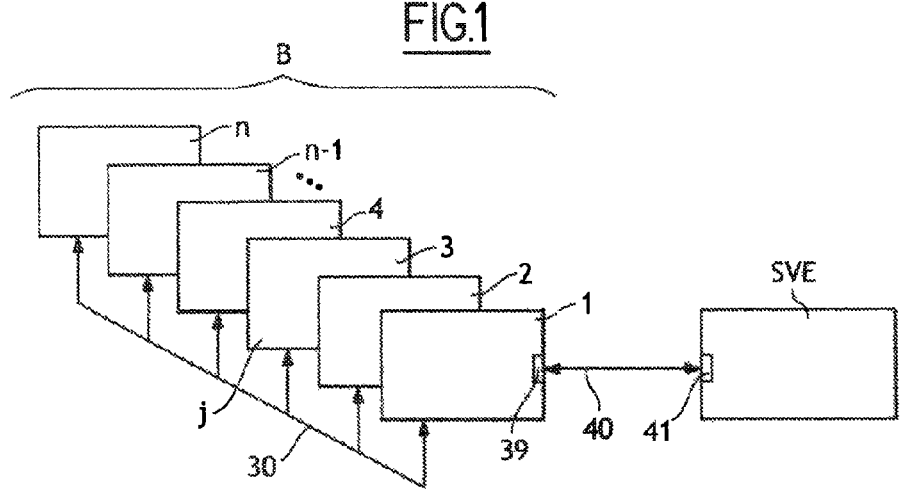
FIG. 1 schematically illustrates the interconnection of the modules of a battery according to the invention.
Figure 2:
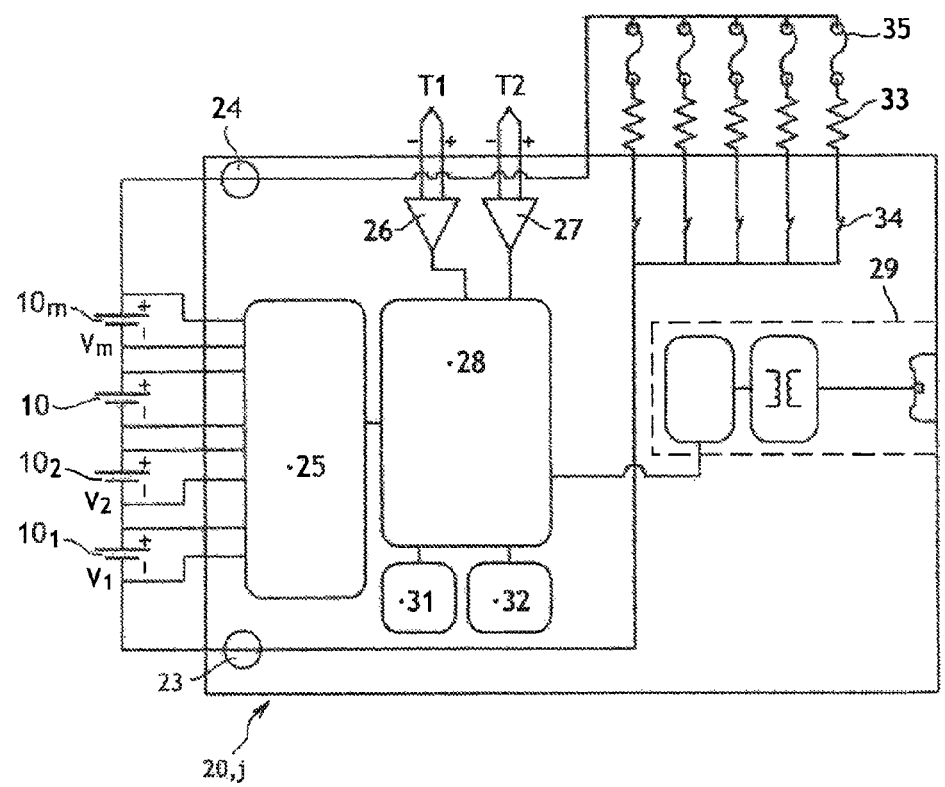
FIG. 2 schematically illustrates a battery module according to FIG. 1.

In the following description, the battery modules are in series. In the figures, the battery B includes n modules 1, 2, 3, 4 . . . n−1, n, designated below generally by j. Each module j includes the same number m of identical rechargeable and dischargeable cells 10 in series as well as a unit 20 for controlling its own cells 10. In FIG. 2, this control unit 20 is for example in the form of an electronic card.

The unit 20 of each module j includes two terminals 23, 24 connected to both ends of the cells 10 combined in series, through which the discharge current flowing from the cells 10 and the regeneration current flowing towards the cells 10 are supplied. The high voltage terminal 24 of a module j is connected through a power conductor, such as for example a metal bar with a sufficiently large cross-section, to the low voltage terminal 23 of the next module j+1, for putting the modules j and j+1 in series, the battery including two external terminals, one of which is connected to the lowest voltage terminal 23 of the whole of the modules, and the other one is connected to the highest voltage terminal 24 of the whole of the modules, both of these external terminals being intended to be connected to two terminals of a consuming device in order to supply it with electric current.

In the embodiment illustrated in FIG. 2, each module j includes in its unit 20, a unit 25 for measuring the voltage on the terminals of each of its associated cells 10. Further, the modules j include each in their unit 20, one or more units 26, 27 for measuring the temperature of the module in different places, such as for example a unit 26 for measuring temperature in an outer wall zone of the module and a unit 27 for measuring temperature in a central zone of the module. The voltage and temperature measurements of the units 25, 26, 27 are sent to a computing unit 28 of the unit 20, for example including a microcontroller, for processing. The unit 28 is provided with random access memory 31 and a backup memory 32. Further, each module j includes heating units or plates 33 for heating its cells 10 at their nominal operating temperature, these heating plates 33 being supplied with electric current for heating through the terminals 23, 24 for discharging or regenerating cells connected to a consuming device. A heating switch 34 is provided in series with each heating unit 33 in order to be able to heat or selectively cut off either one of the heating units. A heat fuse 35 is also provided in series with each heating unit 33 in order to protect it in the case of excessive temperature above the nominal operating temperature.

The modules j are connected together through a secondary communications network 30, internal to the battery, for example of the CAN type, i.e. a multiplexing network. One of the modules, for example the module 1, is the master, responsible for controlling the secondary communications network 30, while the other modules 2, 3 . . . , n−1, n are slaves of this master module. For this purpose, each of the master and slave modules includes a communications interface 29 for communicating with the secondary network 30.

Figure 3:
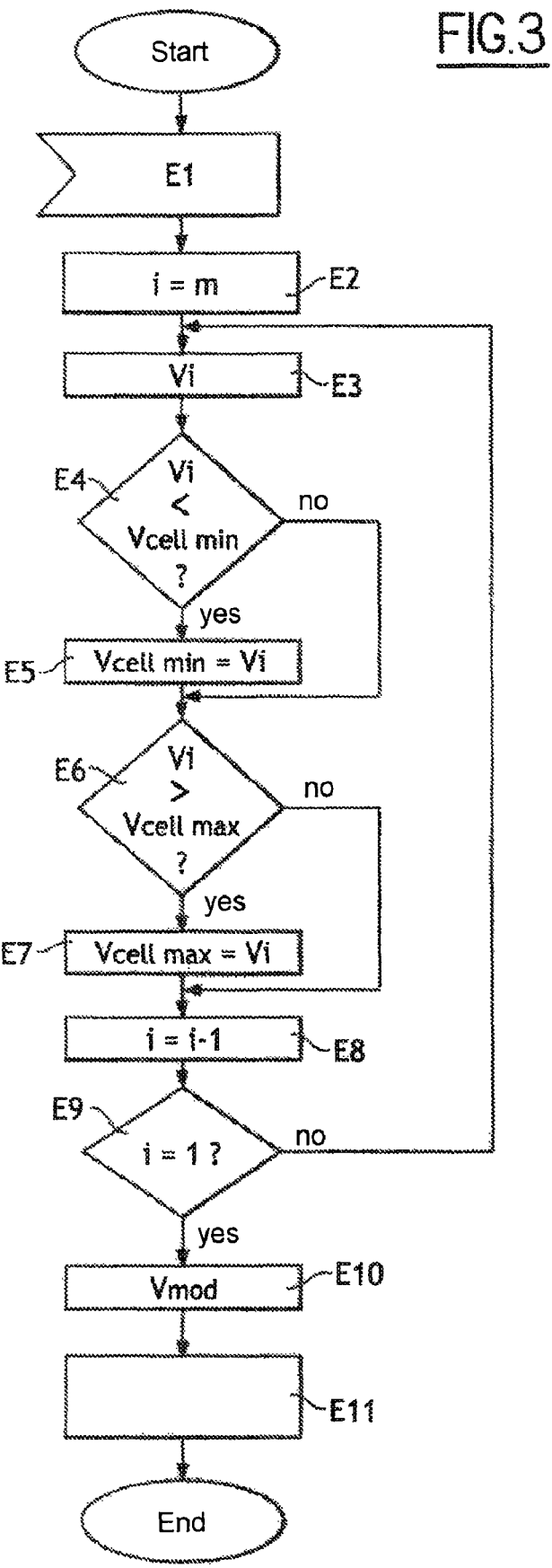
FIG. 3 is a flowchart of a method for acquiring the maximum and minimum cell voltages in a module, according to the invention.

Further, the master module 1 includes another interface 39 with a primary communication network 40 communicating with the outside of the battery B, for example of the CAN type. In the case when the battery B is used by an electric consumer formed by a traction motor drive onboard an electric or hybrid motor vehicle, a supervisor SVE of this traction chain also includes an interface 41 connected to the primary network 40. The separation of both the primary 40 and the secondary 30 communications networks may be considered from a logical or physical point of view; in other words, both of these networks may be interconnected together or not. Each slave module checks the integrity of its measurements before transmitting them via the secondary network 30 to the master module. In the embodiment described below, each slave module 2, 3, 4, . . . , n−1, n executes the procedure for acquiring voltages, illustrated in FIG. 3.

The battery includes means for calculating a maximum discharge and/or regeneration current limit of the pack, as this is described below. The maximum discharge current limit value of the pack and/or the maximum regeneration current limit value of the pack is or are transmitted by a transmission means outwardly. The information or the maximum discharge current of the pack and/or the maximum regeneration current limit value of the pack is transmitted outwards so as to be used on the outside of the battery, for example by a device which has to be connected to the terminals 23, 24. The transmission means for example uses the interface 39. the outside of the battery, for example by a device which has to be connected to the terminals 23, 24. The transmission means for example uses the interface 39.

In step E1, the unit 28 of the slave module receives an input signal initiating the starting of the polling of the measurements. Next, in step E2, the index i of the cell to be polled is initialized to the number m of cells. In step E3, the unit 25 measures the voltage Vi on the terminals of the cell $10_i$, and sends this cell voltage measurement Vi to the unit 28 of the slave module.

Next, in step E4, the unit 28 tests whether the cell voltage Vi measured in step E3 is less than a minimum cell voltage VcellMin of the module, having been initialized beforehand in step E2. If yes in step E4, the minimum cell voltage VcellMin of the module assumes the value Vi of the measured cell voltage and is stored with this value Vi in step E5. If no in step E4, and after E5, it is proceeded with step E6.

During step E6, the unit 28 of the slave module tests whether the cell voltage Vi measured in step E3 is larger than a maximum cell voltage VcellMax of the module, having been initialized in step E2. If yes in step E6, this maximum cell voltage VcellMax of the module assumes the value Vi of the cell voltage measured in step E3 and is stored with this value Vi in step E7. If no in step E6 and after step E7, it is proceeded with step E8, during which the index i of the cell is decremented by one unit.

Next, in step E9, the unit 28 tests whether the whole of the m voltages V1, V2, . . . , Vm of the cells $10_1$, $10_2$, . . . , $10_m$ has been polled, i.e. whether after step E8, i is equal to 1. If no in step E9, it is again proceeded with step E3 for measuring the voltage Vi of the next cell. If yes in step E9, the unit 28 acquires the voltage VMod of the module in step E10, this module voltage VMod being for example equal to the sum of the voltages V1, V2, . . . , Vm of the cells of this module. Next, in step E11, the unit 28 of the slave module sends the minimum cell voltage VcellMin of the module, the maximum cell voltage VcellMax of the module and the voltage VMod of the module to the master module 1 via the secondary communications network 30. The master module 1 executes similar operations E2-E10 in order to determine the minimum voltage VcellMin of its cells, the maximum voltage VcellMax of its cells, and its module voltage VMod.

Figure 4:
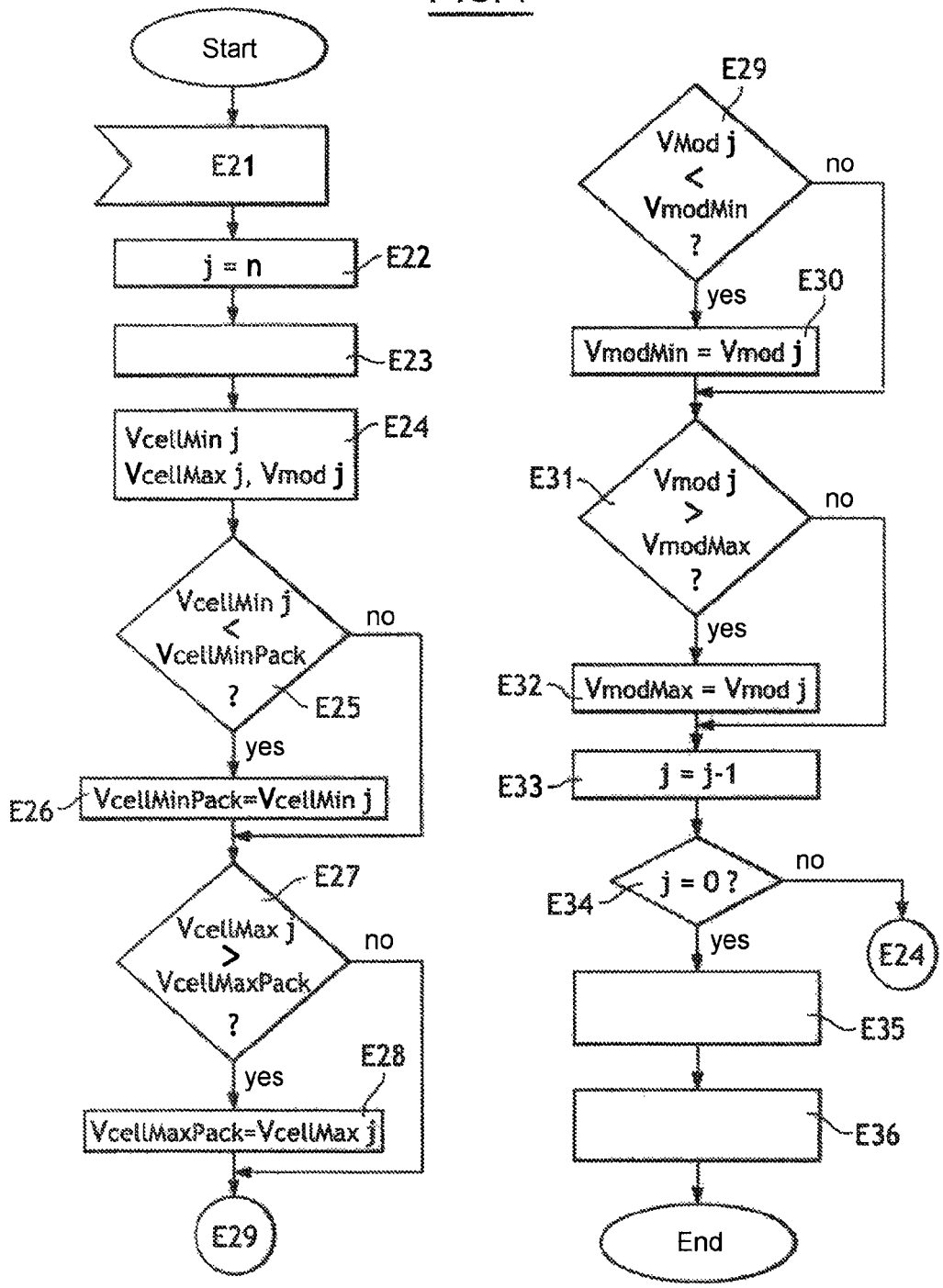
FIG. 4 is a flowchart of the method for acquiring the maximum cell voltage, the minimum cell voltage and the maximum module voltage for the whole of the modules, according to the invention.

Next, the unit 28 of the master module 1 executes the algorithm for acquiring and sorting voltages according to FIG. 4, in order to calculate a first maximum cell voltage VcellMaxPack on the whole of the cells 10 of the battery, a second maximum module voltage VModMax on the whole of the modules 1, 2, . . . , n of the battery, a third minimum cell voltage VCellMinPack on the whole of the cells 10 of the battery and a fourth minimum module voltage VModMin on the whole of the modules 1, 2, . . . , n of the battery. In step E21, the unit 28 of the master module 1 transmits over the network 30 the input signal initiating the starting of the polling of the slave modules 2, 3, . . . , n according to step E1. Next, in step E22, a variable j is initialized to the number n of modules. Then, in step E23, the master module 1 and the slave modules 2, . . . , n acquire the n minimum cell voltages VcellMin of modules 1, 2, . . . , n, the n maximum cell voltages VcellMax of modules 1, 2, . . . , n and the n module voltages Vmod of modules 1, 2, . . . , n, which are sent to the master module 1, according to what has been described above with reference to FIG. 3.

Next, in step E24, the variables VcellMinj, VcellMaxj and Vmodj are made equal to the $j^{th}$ minimum cell voltage Vcellmin, to the $j^{th}$ maximum cell voltage VcellMax and to the $j^{th}$ module voltage Vmod. In step E25, the unit 28 of the master module 1 tests whether the minimum cell voltage variable VcellMinj is less than a minimum cell voltage VcellMinPack, having been previously initialized and stored in the master in step E23. If yes in step E25, the minimum cell voltage VcellMinPack is made equal to the variable VcellMinj during step E26 and is stored. If no in step E25 and after E26, it is proceeded with step E27.

During step E27, the unit 28 of the master module 1 tests whether the maximum cell voltage variable VcellMaxj is larger than a maximum cell voltage VcellMaxPack, having been previously initialized and stored in the master module 1 in step E23. If yes in step E27, the maximum cell voltage VcellMaxPack assumes the value of the variable VcellMaxj and is stored during step E28. If no in step E27 and after E28, it is proceeded with step E29. During step E29, the unit 28 of the master module 1 tests whether the module voltage variable Vmodj is less than a minimum module voltage VmodMin, having been initialized and stored in the master module 1 beforehand during step E23. If yes in step E29, the minimum module voltage VmodMin assumes the value of the variable Vmodj and is stored in step E30. If no in step E29 and after step E30, it is proceeded with step E31.

During step E31, the unit 28 of the master module tests whether the module voltage variable Vmodj is larger than a maximum module voltage VmodMax having been initialized and stored in the master module 1 beforehand during step E23. If yes in step E31, the maximum module voltage VmodMax assumes the value of the variable Vmodj and is stored during step E32. If no in step E31 and after step E32, it is proceeded with step E33.

During step E33, the module index j is decremented by one unit. Next, in step E34, the unit 28 of the master module 1 tests whether the module index j is equal to 0. If yes in step E34, it is proceeded with the algorithm E35 for calculating values of current, as described below. If no in step E34, the process returns to step E24.

Figure 5:
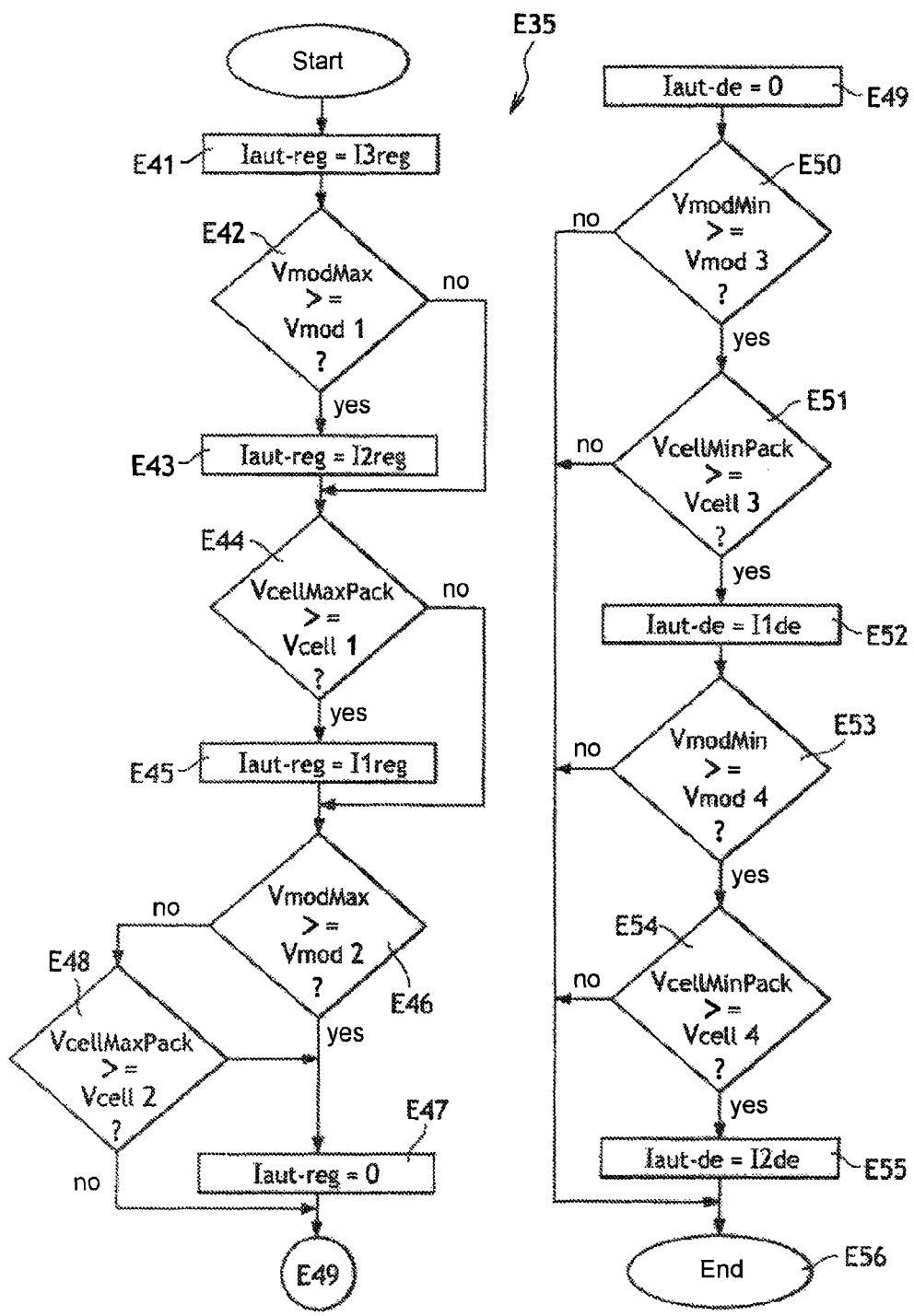
FIG. 5 is a flowchart of the method for automatically adapting the current, depending on voltage values, according to the invention.
Figure 6:
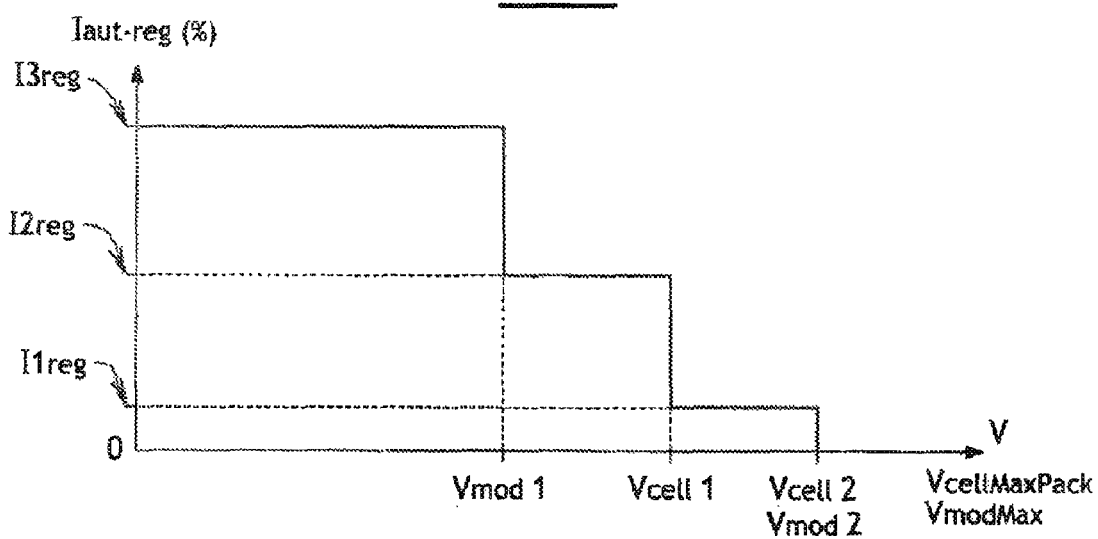
FIG. 6 is a graph of a maximum authorized regeneration current value according to the invention.

The algorithm E35 is described below with reference to FIGS. 5, 6 and 7. In FIGS. 5 and 6, the unit 28 of the master module 1 calculates a maximum authorized value of the regeneration current Iaut-reg of the pack as a function of the maximum cell voltage VcellMaxPack and of the maximum module voltage VmodMax. This calculation is performed from a current characteristic, prerecorded in the unit 28 of the master module 1. Thus, there exists in the unit 28 of the master module 1, a prerecorded characteristic of the maximum authorized regeneration current value, different from a prerecorded characteristic of the maximum authorized discharge current value.

In the following, the current characteristics are shown for example as functions, graphs or tables of values. The current characteristic(s) is (are) prescribed from the intrinsic parameters of the battery, notably those of the cells. The maximum authorized regeneration current value Iaut-reg is initialized in step E41 to an upper prescribed regeneration current value I3reg.

Next, in step E42, the unit 28 of the master module 1 tests whether the maximum module voltage VmodMax is larger than or equal to a first threshold Vmod1. If yes in step E42, the maximum authorized regeneration current value Iaut-reg assumes a second intermediate prescribed regeneration current value I2reg in step E43. If no in step E42 and after step E43, it is proceeded with step E44.

During step E44, the unit 28 of the master module 1 tests whether the maximum cell voltage VcellMaxPack is larger than or equal to a first cell voltage threshold Vcell1. If yes in step E44, the maximum authorized regeneration current value Iaut-reg assumes a lower regeneration current value I1 reg in step E45. If no in step E44 and after step E45, it is proceeded with step E46.

During step E46, the unit 28 of the master module 1 tests whether the maximum module voltage VmodMax is larger than or equal to a second module voltage threshold Vmod2. If yes in step E46, the maximum authorized regeneration current value Iaut-reg assumes zero value in step E47. If no in step E46, it is proceeded with step E48, during which the unit 28 of the master module 1 tests whether the maximum cell voltage VcellMaxPack is larger than or equal to a second cell voltage threshold Vcell2. If yes in step E48, it is proceeded with step E47. If no in step E48 and after step E47, it is proceeded with step E49.

As shown in FIG. 6, the first module voltage threshold Vmod1 is lower than the second module voltage threshold Vmod2. The first cell voltage threshold Vcell1 is lower than the second cell voltage threshold Vcell2. The horizontal axis illustrates at the top the maximum cell voltage VcellMaxPack and at the bottom the maximum module voltage VmodMax.

The lower regeneration current value I1reg is less than the intermediate regeneration current value I2reg, itself less than the upper regeneration current value I3reg. The vertical axis illustrates the maximum authorized regeneration current value Iaut-reg, expressed as a percentage. In an exemplary embodiment,
n=10 modules,
m=12 cells per module,
I3reg=100%,
I2reg=50%,
I1reg=12%,
Vcell1=3.35 volts,
Vcell2=3.4 volts,
Vmod1=36 volts,
Vmod2=40 volts.

The unit 28 of the master module 1 calculates a maximum authorized discharge current value Iaut-de of the pack as a function of the minimum cell voltage VcellMinPack and of the minimum module voltage VmodMin, as this is described below with reference to FIGS. 5 and 7. In step E49, the maximum authorized discharge current value Iaut-de is initialized to a zero value. Next, in step E50, the unit 28 of the master module 1 tests whether the minimum module voltage VmodMin is larger than or equal to a third module voltage threshold Vmod3. If yes in step E50, it is proceeded with step E51, during which the unit 28 of the master module 1 tests whether the minimum cell voltage VcellMinPack is larger than or equal to a third cell voltage threshold Vcell3.

If yes in step E51, the maximum authorized discharge current value Iaut-de assumes an intermediate discharge current value I1de in step E52. Next, in step E53, the unit 28 of the master module 1 tests whether the minimum module voltage VmodMin is larger than or equal to a fourth module voltage threshold Vmod4. If yes in step E53, it is proceeded with step E54, during which the unit 28 of the master module 1 tests whether the minimum cell voltage VcellMinPack is larger than or equal to a fourth cell voltage threshold Vcell4. If yes in step E54, the maximum authorized discharge current value Iaut-de assumes an upper value I2de in step E55. If no in steps E50, E51, E53, E54 and after E55, it is proceeded with a final step E56.

Figure 7:
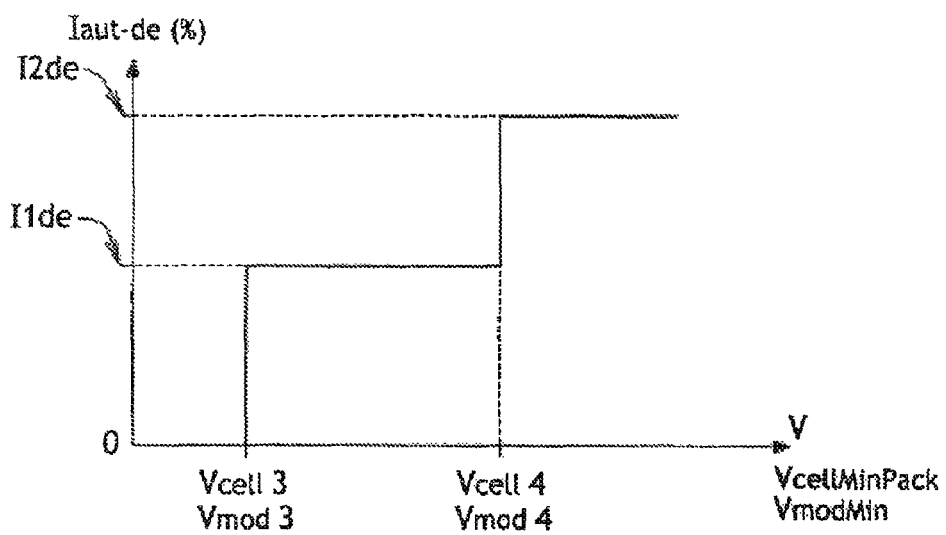
FIG. 7 is a graph of a maximum authorized discharge current value according to the invention.

In FIG. 7, the horizontal axis illustrates at the bottom the minimum cell voltage VcellMinpack, and at the bottom the minimum module voltage VmodMin. The third cell voltage threshold Vcell3 is lower than the fourth cell voltage threshold Vcell4. The third module voltage threshold Vmod3 is lower than the fourth module voltage threshold Vmod4. For VcellMaxPack=Vcell4 and VmodMax=Vmod4, Iaut-reg=I3reg, as this is illustrated in FIG. 6.

The vertical axis illustrates the maximum authorized discharge current value Iaut-de, as a percentage. The intermediate discharge current value I1de is larger than 0 and less than the upper discharge current value I2de. In an exemplary embodiment, n=10 modules,
m=12 cells per module,
I2de=100%,
I1de=50%,
Vcell3=1.8 volt,
Vcell4=2.2 volts,
Vmod3=21 volts,
Vmod4=30 volts.

The master module 1 also executes an algorithm for acquiring and sorting temperatures, which is described below with reference to FIG. 8. In step E61, the unit 28 of the master module emits an input signal initiating the starting of the polling of the slave modules. Next, in step E62, the number j of the modules to be polled is initialized to n.

In the next step E63, the unit 28 of the master module acquires the maximum temperature Tmax from information provided by its units 26, 27 for measuring temperatures T1 and T2. The maximum module temperature Tmax is initialized to the temperature Tmax1 of the master module 1 and is stored by the latter. Next, in step E64, the maximum temperature Tmaxj of the slave module j is acquired by the unit 28 of the latter and is sent via the secondary communications network 31 to that of the master module 1.

Next, in step E65, the unit 28 of the master module 1 tests whether the maximum temperature Tmaxj of module j is larger than the maximum temperature TMax. If yes in step E65, the maximum temperature TMax assumes the value of the maximum temperature Tmaxj of the module j and is stored in step E66. If no in step E65 and after step E66, it is proceeded with step E67, during which the module index j is decremented by one unit.

Next, in step E68, the unit 28 of the master module tests whether the whole of the modules have been polled, i.e. whether the index j is equal to 0. If yes in step E68, it is proceeded with the final step E69. If no in step E68, one returns to step E64.

The unit 28 of the master module 1 then calculates on the basis of prerecorded current characteristics, a maximum admissible regeneration current value Iad-reg and a maximum admissible discharge current value Iad-de as a function of the maximum module temperature TMax. For this purpose, there exists a prerecorded characteristic of the maximum admissible discharge current value and a prerecorded characteristic of the maximum admissible regeneration current value, as this is described below as an example with reference to FIGS. 9 and 10. These maximum admissible discharge current value characteristic and maximum admissible regeneration current value characteristic are for example decreasing and continuous functions of the maximum module temperature TMax.

In FIG. 10, the graph of these maximum admissible regeneration current value Iad-reg and maximum admissible discharge current Iad-de value has, from the first temperature threshold T_Imax to the second temperature threshold T3, a linear form =a.TMax+b. Below and at the first temperature threshold T_Imax, the maximum admissible regeneration current value Iad-reg and maximum admissible discharge current value Iad-de are respectively equal to a fourth upper regeneration current value Imax-reg and to a fourth upper discharge current value Imax-de. Above and at the second temperature threshold T3, the maximum admissible regeneration current value Iad-reg and maximum admissible discharge current value Iad-de are respectively equal to a fifth lower regeneration current value I_Tmax-reg and to a fifth lower discharge current value I_Tmax-de.

In FIG. 9, the coefficients a, b and the second upper values Imax-reg and Imax-de are initialized in step E71. Next, in step E72, there are two coefficients c and d, involved in the calculation of a current limiting coefficient Clim, which are initialized. Generally, d/c=b/a. Next, in step E73, the maximum admissible regeneration current value Iad-reg is initialized to the fourth upper value Imax-reg, and the maximum admissible discharge current value Iad-de is initialized to the fourth upper value Imax-de.

Then in step E74, the unit 28 of the master module 1 tests whether the maximum module temperature TMax is larger than or equal to the first temperature threshold T_Imax. If yes in step E74, the unit 28 of the master module proceeds with step E75. In step E75, the unit 28 of the master module 1 tests whether the maximum module temperature TMax is larger than or equal to the second temperature threshold T3.

If no in step E75, the unit 28 of the master module calculates:

the maximum admissible regeneration current value Iad-reg according to the formula:

$$\text{Iad-reg}=a*\text{Tmax}+b,$$

the maximum admissible discharge current value Iad-de according to the formula:

$$\text{Iad-de}=a*\text{Tmax}+b, \text{ and}$$

the current limitation coefficient Clim according to the formula:

$$\text{Clim}=C*\text{Tmax}+b.$$

The coefficients a and b are prescribed for upper determined values Imax-reg and Imax-de, for example equal.

In an exemplary embodiment, for Imax-reg=Imax-de=230A, a=−21 and b=2330, the temperatures being expressed in ° C.

The limitation coefficient Clim corresponds to an upper value Imax-reg=Imax-de =1A and corresponds in the exemplary embodiment above to:

c=0.0913
d=10.13

After step E76, the unit 28 of the master module 1 tests in step E77 whether the maximum admissible regeneration current value Iad-reg is larger than the fourth value Imax-reg. If yes in step E77, the maximum admissible regeneration current value Iad-reg is made equal to the fourth upper value Imax-reg in step E78. If no in step E77 and after step E78, it is proceeded with step E79. During step E79, the unit 28 of the master module 1 tests whether the maximum admissible discharge current value Iad-de is larger than the fourth upper value Imax-de. If yes in step E79, the maximum admissible discharge current value Iad-de is made equal to the fourth upper value Imax-de in step E80. If no in step E79 and after step E80, it is proceeded with step E81.

During the step E81, the unit 28 of the master module 1 tests whether the maximum admissible regeneration current value Iad-reg is less than the fifth lower regeneration current value I_Tmax-reg. If yes in step E81, the maximum admissible regeneration current value Iad-reg is made equal to the fifth lower regeneration current value I_Tmax-reg during step E82. If no in step E81 and after step E82, it is proceeded with step E83.

During step E83, the unit 28 of the master module 1 tests whether the maximum admissible discharge current value lad-de is less than the fifth lower discharge current value I_Tmax-de. If yes in step E83, the maximum admissible discharge current value lad-de is made equal to the fifth lower discharge current value I_Tmax-de during step E84. If no in step E83 and after step E84, it is proceeded with the end step E85. Also, if no in step E74, it is proceeded with the end step E85. If yes in step E75, it is proceeded with step E86, during which the maximum admissible regeneration current value lad-reg is made equal to the fifth lower regeneration current value I_Tmax-reg, and the maximum admissible discharge current value lad-de is made equal to the fifth lower discharge current value I_Tmax-de.

Of course, the master module 1 may compute for the regeneration current only the maximum authorized value laut-reg, or only the maximum admissible value lad-reg, this maximum value then forming the maximum limit for the regeneration current. Also, the master module 1 may compute, for the discharge current, only the maximum authorized value laut-de or only the maximum admissible value lad-de, this maximum value then forming the maximum discharge current limit. When for the regeneration current, both the maximum authorized value laut-reg and the maximum admissible value lad-reg are computed, the unit 28 of the master module 1 determines the maximum regeneration current limit as being the largest of both maximum values laut-reg, lad-reg. When for the discharge current, both the maximum authorized value laut-de and the maximum admissible value lad-de are computed, the unit 28 of the master module 1 determines the maximum discharge current limit as being the largest of both maximum values laut-de, lad-de.

The unit 28 of the master module 1 provides the maximum regeneration current limit, equal to the maximum authorized value laut-reg or to the maximum admissible value lad-de, and the maximum discharge current limit, equal to the maximum authorized value laut-de or to the maximum admissible value lad-de. The maximum regeneration current limit and the maximum discharge current limit are sent in step E36 by the unit 28 of the master module 1 to the interface 39 so as to become information available outside of the battery. These maximum regeneration current and discharge current limits are for example forwarded by the interface 39 on the primary communications network 40 to the supervisor SVE.

What is claimed is:

1. A battery comprising:
   a pack of a plurality of modules, each containing a multiplicity of rechargeable cells in series, the battery further including a measuring unit operably measuring at least one of: (a) the voltage of at least one cell and (b) the temperature of at least one module,
   a computer operably computing, based on the voltage and/or temperature measured by the measuring unit and on a recorded characteristic of at least one of: (a) the discharge current and (b) regeneration current of the battery, a maximum of at least one of: (a) discharge and (b) regeneration current limit of the pack; and
   a transmitter operably transmitting outside the information on the maximum of at least one of: (a) the discharge and (b) regeneration current limit of the pack.

2. The battery according to claim 1, wherein the modules are in series and the recorded current characteristics from the computer relate to the modules in series.

3. The battery according to claim 1, wherein the battery includes at least one of:
   on each module, a measuring unit operably measuring the voltage of several cells of the module; and
   a measuring unit operably measuring the temperature of several modules; and
   the computer includes:
     a first controller operably computing, from at least one of: (a) the voltages and (b) the temperatures measured by the measuring unit, at least one first extremal quantity, selected from:
     a maximum cell voltage;
     a maximum module voltage;
     a minimum cell voltage;
     a minimum module voltage;
     a maximum module temperature;
     a second controller operably computing, as a maximum of at least one of: (a) discharge and (b) regeneration current limit of the pack, at least one value from:
     a maximum authorized pack regeneration current value depending on at least one of: (a) the maximum cell voltage and (b) the maximum module voltage;
     a maximum authorized pack discharge current value depending on at least one of: (a) the minimum cell voltage and (b) the minimum module voltage;
   a maximum admissible pack regeneration current value depending on the maximum module temperature; and
   a maximum admissible pack discharge current value depending on the maximum module temperature.

4. The battery according to claim 3, wherein each module includes the first controller, one of the modules is a master, while the other modules are slaves of the master module so as to transmit to it said at least one first extremal quantity through a communications network connecting the modules with each other, the second controller and the outward transmitter being provided on the master module.

5. The battery according to claim 3, wherein the maximum authorized regeneration current value is computed by the second controller, so that:
   it is equal to a first upper regeneration current value when the maximum module voltage is less than a first module voltage threshold,
   it is equal to a second intermediate regeneration current value when both the maximum module voltage is larger than or equal to the first module voltage threshold and the maximum cell voltage is less than a first cell voltage threshold;
   it is equal to a third lower regeneration current value, when both the maximum cell voltage is larger than or equal to the first cell voltage threshold and less than a second cell voltage threshold, and the maximum module voltage is less than a second module voltage threshold;
   it is zero, when the maximum cell voltage is larger than or equal to the second cell voltage threshold or when the second maximum module voltage is larger than or equal to the second module voltage threshold; and
   the first cell voltage threshold being smaller than the second cell voltage threshold, and the first module voltage threshold being smaller than the second module voltage threshold.

6. The battery according to claim 3, wherein the maximum authorized discharge current value is computed by the second controller so that:
   it is equal to a first intermediate discharge current value, when both the minimum module voltage is larger than or equal to a third module voltage threshold and less than a fourth module voltage threshold, and the minimum cell voltage is larger than or equal to a third cell voltage threshold and less than a fourth cell voltage threshold;
   it is equal to a second upper discharge current value when both the third minimum cell voltage is larger than the fourth cell voltage threshold and the fourth minimum module voltage is larger than the fourth module voltage threshold; and it is zero otherwise.

7. The battery according to claim 3, wherein the maximum admissible regeneration current value is calculated by the second controller, so that:

it is equal to a fourth upper regeneration current value, when the maximum module temperature is less than a first module temperature threshold;

it is equal to a decreasing function of the maximum module temperature, when the maximum module temperature is larger than or equal to the first module temperature threshold and less than a second module temperature threshold, the values of this function being less than or equal to the fourth upper regeneration current value and larger than or equal to a fifth lower regeneration current value; and it is otherwise equal to the fifth lower regeneration current value, either positive or zero.

8. The battery according to claim 3, wherein the maximum admissible discharge current value is computed by the second controller, so that:

it is equal to a first upper discharge current value, when the maximum module temperature is less than a first module temperature threshold;

it is equal to a decreasing function of the maximum module temperature, when the maximum module temperature is larger than or equal to the first module temperature threshold and less than a second module temperature threshold, the values of this function being less than or equal to the fourth upper discharge current value and larger than or equal to a fifth lower discharge current value; and it is otherwise equal to the fifth lower discharge current value, either positive or zero.

9. The battery according to claim 7, wherein the decreasing function of the maximum module temperature is linear.

10. The battery according to claim 3, wherein:

the second controller is provided for computing, for the discharge current and/or the regeneration current, both a maximum authorized value and a maximum admissible value; and the maximum discharge and/or regeneration current limit of the pack being the largest of both the maximum authorized value and the maximum admissible value.

11. The battery according to claim 1, further comprising at least one of:

(a) a measuring unit measuring the voltage of each cell; and
(b) a measuring unit measuring the temperature of each module.

12. The battery according to claim 1, further comprising a measuring unit measuring the module temperature in at least two different zones of the module, the measured temperature of the module being the largest of the temperatures of the zones of the module.

13. The battery according to claim 1, wherein the transmitter further comprises an interface with a network for communication to the outside.

14. The battery according to claim 1, wherein the cells are made by assemblies of thin films.

15. The battery according to claim 1, wherein the cells have a nominal operating temperature above 20° C.

16. The battery according to claim 1, wherein the cells are of a lithium-metal-polymer type.

17. The battery according to claim 1, wherein each module further includes at least one unit for heating its cells to their nominal operating temperature above 20° C.

18. A motor vehicle, comprising a traction motor drive and at least one battery according to claim 1, for supplying at least temporarily the traction motor drive with electric power, the traction motor drive further comprising a supervisor for receiving information on the maximum of at least one of: (a) discharge and (b) regeneration current limit of the pack, sent by the transmitter of the battery.

* * * * *